(12) United States Patent
Broeder et al.

(10) Patent No.: US 8,306,947 B2
(45) Date of Patent: Nov. 6, 2012

(54) REPLICATION OF OPERATIONS ON OBJECTS DISTRIBUTED IN A STORAGE SYSTEM

(75) Inventors: Sean L. Broeder, Sunnyvale, CA (US); Gordon J. Bowring, San Jose, CA (US); James J. Collison, Indianapolis, IN (US); Vilmar Olsen, Copenhagen (DK); David W. Birdsall, Santa Clara, CA (US); Gary M. Gilbert, Arlington Heights, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 12/261,473

(22) Filed: Oct. 30, 2008

(65) Prior Publication Data

US 2010/0114817 A1    May 6, 2010

(51) Int. Cl.
*G06F 17/30* (2006.01)
(52) U.S. Cl. ........ 707/610; 707/611; 707/612; 707/613; 707/614
(58) Field of Classification Search .................. 707/609, 707/610
See application file for complete search history.

(56) References Cited

U.S. PATENT DOCUMENTS

| 2006/0179081 | A1* | 8/2006 | Vedula | 707/203 |
| 2009/0217274 | A1* | 8/2009 | Corbin et al. | 718/101 |
| 2010/0332448 | A1* | 12/2010 | Holenstein et al. | 707/615 |

* cited by examiner

*Primary Examiner* — Baoquoc To

(57) ABSTRACT

One embodiment is a method that reads audit from an audit trail of a source database distributed across multiple storage systems with independent audit trails and then replicates the audit trail to a target database distributed across multiple storage systems with independent audit trails without manual coordination by a database administrator.

8 Claims, 9 Drawing Sheets

REPLICATION OF OPERATIONS ON OBJECTS DISTRIBUTED IN A STORAGE SYSTEM

BACKGROUND

Enterprises commonly maintain multiple copies of important data that is distributed across storage systems that include primary and backup databases. Changing the physical layout of a replicated database requires careful coordination between the primary and backup databases. Such coordination is difficult since distributed databases can have multiple primary nodes with independent audit trails.

Failure to properly synchronize update records with the correct incarnation of the physical database can result in various errors and shortcomings. For example, data records can be applied to the incorrect partition in the database such that the records are subsequently inaccessible. As another example, data records of a particular physical layout can be applied to a table with a different physical layout, which can cause unpredictable behavior, including a system outage. Further, improperly synchronizing update records can cause the entire database to become corrupt and require repopulation.

Proper coordination of these operations is necessary to the ongoing use and availability of the database system as a whole.

DETAILED DESCRIPTION

Exemplary embodiments in accordance with the invention relate to systems and methods to automate the replication of Structured Query Language (SQL) operations. SQL operations include Data Modification Language (DML) operations, which modify the data content within an existing SQL object, Data Definition Language (DDL), and Utility operations which create, modify the structure of, or destroy SQL objects distributed across multiple nodes in a storage system. One embodiment uses a Remote Duplicate Database Facility (RDF) to replicate changes made to the database content, for example using Data Modification Language (DML).

Exemplary embodiments enable a user to change a physical layout of a replicated database in a storage environment where multiple primary nodes have independent audit trails. In a storage system with primary and target databases distributed across multiple nodes, proper synchronization between the primary and target databases ensures that data records are applied to the correct partition in the database.

In one exemplary embodiment, the storage system includes databases that are partitioned across multiple storage devices or disks such that multiple systems or nodes are networked together. By way of example, each system or node can include one transaction manager, 16 or more central processing units (CPUs), and 250 or more disks.

Generally, a transaction manager for a system or node writes all audit trails to ensure that transactions commit in a correct order. In some instances, a single transaction spans across multiple disks and multiple segments or nodes. Since the transaction managers are distributed, a transaction can start in one node and complete in another node. Exemplary embodiments ensure that such transactions remain synchronous so insert operations between the different nodes occur in a correct order (i.e., not out-of-order). In other words, without the use of exemplary embodiments, different transaction managers can apply different orders to distributed transactions. To ensure proper ordering for such distributed transactions using multiple transaction managers, exemplary embodiments in accordance with the invention provide logical updates to the table before the DDL operation. For example, all Data Manipulation Language (DML) changes to the source database performed prior to changing its physical layout via a DDL or utility operation are applied to the target database before changing the physical layout of the target database to match the source database. Furthermore, none of the DML changes to the source database performed after a DDL or utility operation are applied to the target database until the target database has been modified to match the source database.

Figure 1:
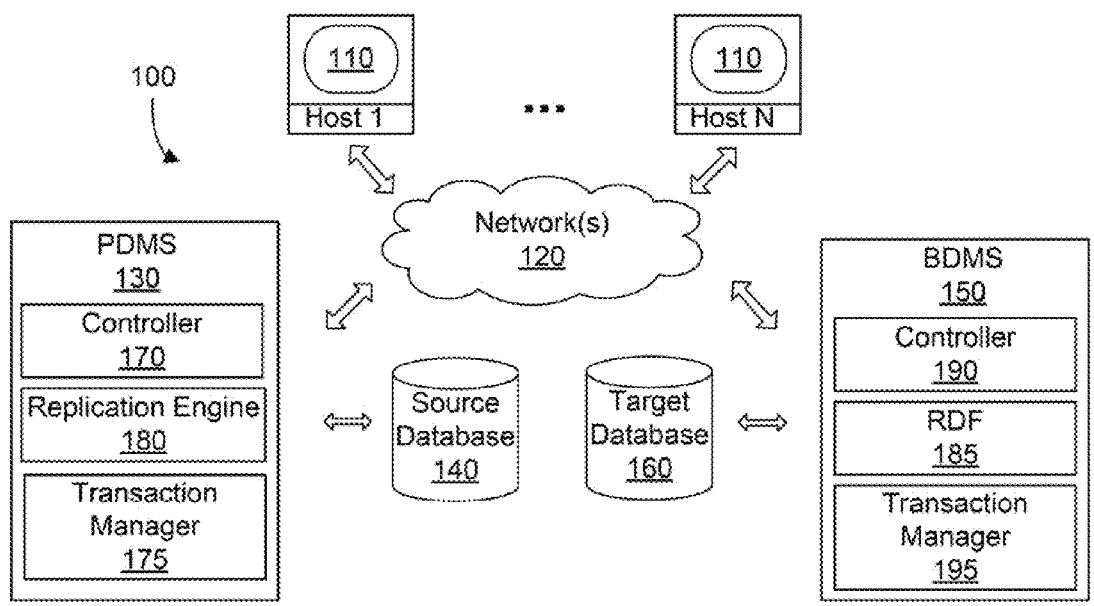
FIG. 1 is a block diagram of an exemplary distributed file or storage system in accordance with an exemplary embodiment of the invention.

FIG. 1 is a block diagram of an exemplary distributed file or storage system 100 in accordance with an exemplary embodiment of the invention. By way of example, the system is a cluster storage network and/or a storage area network (SAN) that includes a plurality of host computers 110 (shown as host 1 to host N) coupled through one or more networks 120 to primary database management system (PDMS) 130 and storage devices and/or source database 140 and a backup database management system (BDMS) 150 and storage devices and/or target database 160. The PDMS 130 includes one or more controllers 170, a transaction manager 175, and a replication engine 180. The BDMS 150 includes one or more controllers 190, a Remote Duplicate Database Facility (RDF) 185, and a transaction manager 195.

The hosts communicate with the primary database management system 130 using a small computer system interface (SCSI) or other interface/commands over a fiber channel (FC). By way of example, networks 120 include one or more of the Ethernet, fibre channel (FC), serial attached SCSI (SAS), iSCSI, internet, local area network (LAN), wide area network (WAN), public and/or private networks, etc.

In one exemplary embodiment, the controllers 170 and 190 are array controllers and the source and target databases 140 and 160 include one or more disk arrays. For example the disk arrays are network attached devices that provide random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controllers and disk arrays are memory nodes that include one or more servers.

The controller 170 manages various data storage and retrieval operations. For example, controller 170 receives I/O requests or commands from the host computers 110, such as data read requests, data write requests, maintenance requests, etc. and processes the storage and retrieval of data on the multiple disk arrays and/or source database. In one exemplary embodiment, controller 170 is a separate device or may be part of a computer system, such as a server. Additionally, the controller 170 can be located with, proximate, or a great geographical distance from the source database 140 and/or BDMS 150 from each other.

In one exemplary embodiment, the storage devices (i.e., source and target databases 140 and 160) are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one embodiment, storage devices are physically located in a same data center. In another embodiment, the storage devices are located a great geographical distance apart in separate data centers. Further, although only two storage devices are shown, a SAN can include hundreds or thousands of such storage devices.

In one exemplary embodiment, a source database or portions thereof are copied to a target database. The replication engine 180 is used to duplicate data from the source database 140 to the target database 160. Changes to the source database are logged in transaction logs. The replication engine reads the transaction logs and applies the changes to the target database.

Figure 2:
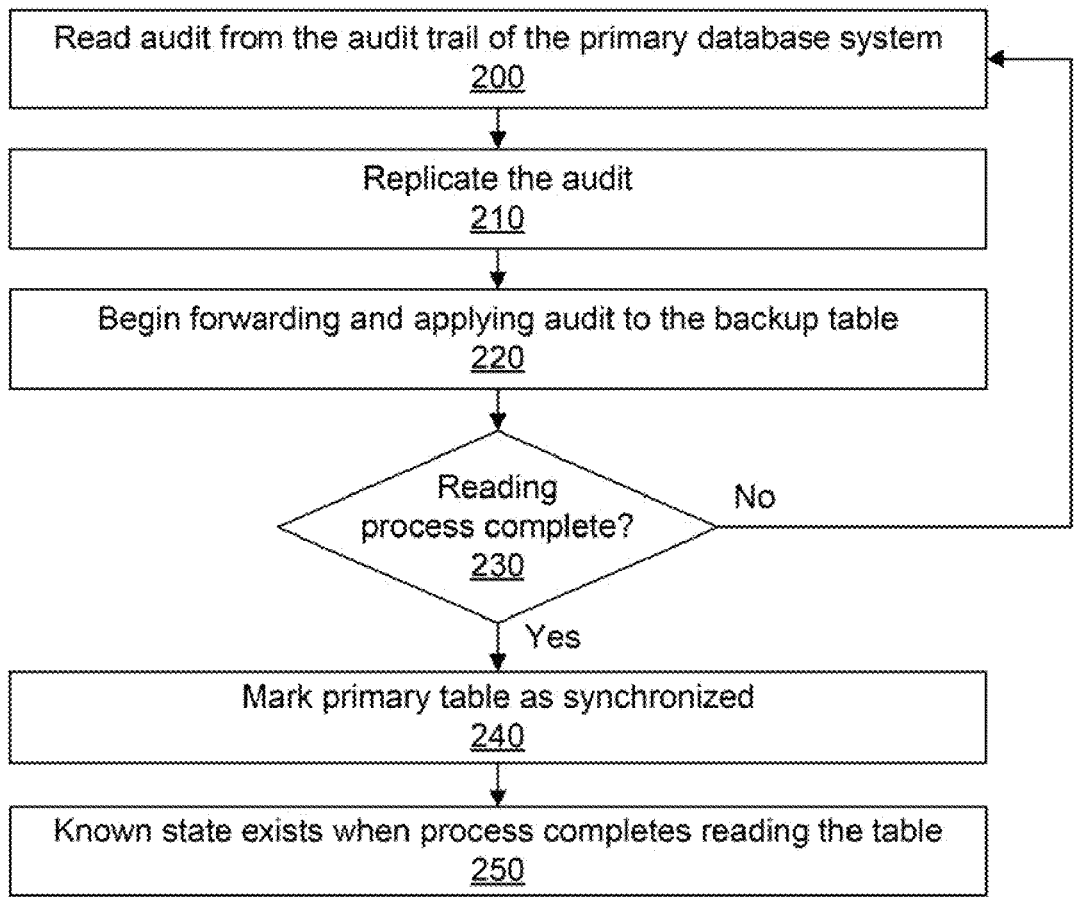
FIG. 2 shows a flow diagram for reading a table into the backup database to arrive at a consistent state between the primary database and the backup database in accordance with an exemplary embodiment.

FIG. 2 shows a flow diagram for reading a table into the backup database to arrive at a consistent state between the primary database and the backup database.

According to block 200, audit is read from the audit trail on the primary database system. This audit is then replicated according to block 210.

According to block 220, the replicated audit is forwarded and applied to the backup table in the backup or target database system.

According to block 230, a question is asked as to whether the reading process is complete. If the process is not complete, then flow proceeds back to block 200 where more audit is read. If the process is complete, then flow proceeds to block 240 wherein the primary table is marked as synchronized. By way of example, the table can be marked as being synchronized either with separate audit records, with flags in the audit records, or messages to the replication engine.

According to block 250, a known state exists when the process completes reading the table. When the process has completed reading the table, we are at a known consistent state.

Since the RDF 185 performs replications at the audit record level, the structure of the SQL tables in one exemplary embodiment are identical on both the primary and backup database systems. For example, a mismatch of a row layout between the primary and backup database systems could result in update and reporting errors and even Central Processing Unit (CPU) halts. Table matching in the primary and target database systems prevents such errors.

Exemplary embodiments include automated DDL replication from the primary to the backup database system. This automation reduces various steps previously required to be performed by a database administrator (DBA). For instance, changes to the table structure on the primary database are not manually coordinated by the database administrator between the primary system, RDF and the backup system. By way of further illustration, an offline DDL change would typically require 7 steps as follows:

1) Update activity must be stopped against the table on the primary cluster.
2) The database administrator (DBA) must then make the required DDL change to the table on the primary system.
3) The DBA would ensure all the audit prior to the DDL change was replicated and applied to the backup system by observing the relative time delay values in a RDF-COM STATUS RDF display.
4) The RDF updaters are stopped to ensure the table is closed.
5) The same DDL change on the tables on the backup node is then made. Here the operator must be careful to include all required information and explicitly override any defaults that are different between the cluster on the source and the target databases.
6) The RDF updaters are then restarted.
7) Transaction activity against the table on the primary system is then restarted.

In the above example, user intervention is required at each of the seven steps. Such user intervention can be a costly and time consuming endeavor that is prone to operator error and data corruption. Also, while these operations are underway other applications waiting to load the additional data into the database must wait as the database cannot be manipulated until the operation is complete. Furthermore, these operations can take a very long time to complete, and it is not possible to safely perform the operations on the source and target databases in parallel. Instead, the operation must be initiated on the source database and verified that it completed successfully before the operation can be initiated on the target database. Such operations, however, cannot be initiated in parallel. Instead, serial processing is required in case the operation fails on the source database. If the operation were performed in parallel on the two databases and the operation were to fail on the primary, the database structures would be different and replication could not resume without database corruption. Furthermore, many of these operations have no inverse, so there is no possibility to undo a successful operation on the target database if the operation failed on the source database. Consequently, the source database must remain offline for the duration of the operation as a minimum. For many customers, whose businesses rely on online transaction processing (OLTP) and high availability, having the database unavailable during this time is unacceptable.

Exemplary embodiments solve such problems since no manual intervention is necessary to perform DDL replication from the primary to the backup database systems. Exemplary embodiments provide a mechanism to perform one or more of the following:

1) Avoid inactivating user applications that modify the source database before initiating a DDL or utility operation.
2) Leave the source database completely available while DDL or utility operations are being performed. In other words, the source database is not taken offline, but remains active.
3) Ensure that all data modifications located in the source audit trail prior to a DDL or utility operation on a particular source node are applied and durable before a DDL or utility operation is initiated on the target node.
4) Ensure that no data modifications located in the source audit trail subsequent to a DDL or utility operation on a particular source node are applied before a DDL or utility operation is initiated on the target node.
5) Provide mechanisms to globally synchronize replication audit trails across clustered nodes with independent audit trails.
6) Provide mechanisms to automatically trigger DDL or utility operations on the target database without user intervention.
7) Provide mechanisms to ensure that the DDL or Utility operation on the target behaves exactly as the operation on the source by explicitly enumerating all defaults that were present and used on the source in case the defaults are different on the target.
8) Provide mechanisms to reliably replicate user transactions that perform Data Manipulation Language (DML) and DDL operations within the same transaction.
9) Safely initiate a DDL or utility operation as soon as it is detected on the target database and before it has completed on the source database.
10) Ensure a DDL operation executed in parallel on the target system does not complete before the operation completes on the source. The same is true for each step of a multi-step operation. In other words, step n completes on the source before step n can complete on the target or step n+1 can begin.

In one embodiment, the RDF performs disaster recovery and database replication. The RDF provides replication of SQL/MX tables for each segment in the primary database system to an identically configured backup database system (SQL/MX being an exemplary embodiment of a SQL database management system). In one embodiment, the databases on the primary and backup systems are logically identical in structure. For example, the number and order of the table columns are identical between the primary and backup systems; and the number and boundaries of the table partitions are identical between the primary and backup systems. When a user makes changes to the structure (DDL) of a table on the primary system, this change is automatically reflected on the backup system without requiring manual intervention to make the change.

As noted, exemplary embodiments provide systems and methods to automatically replicate user performed DDL and utility operations on an RDF backup database system without additional or manual intervention. DDL Replication is a joint effort between both SQL/MX and RDF.

Figure 3A:
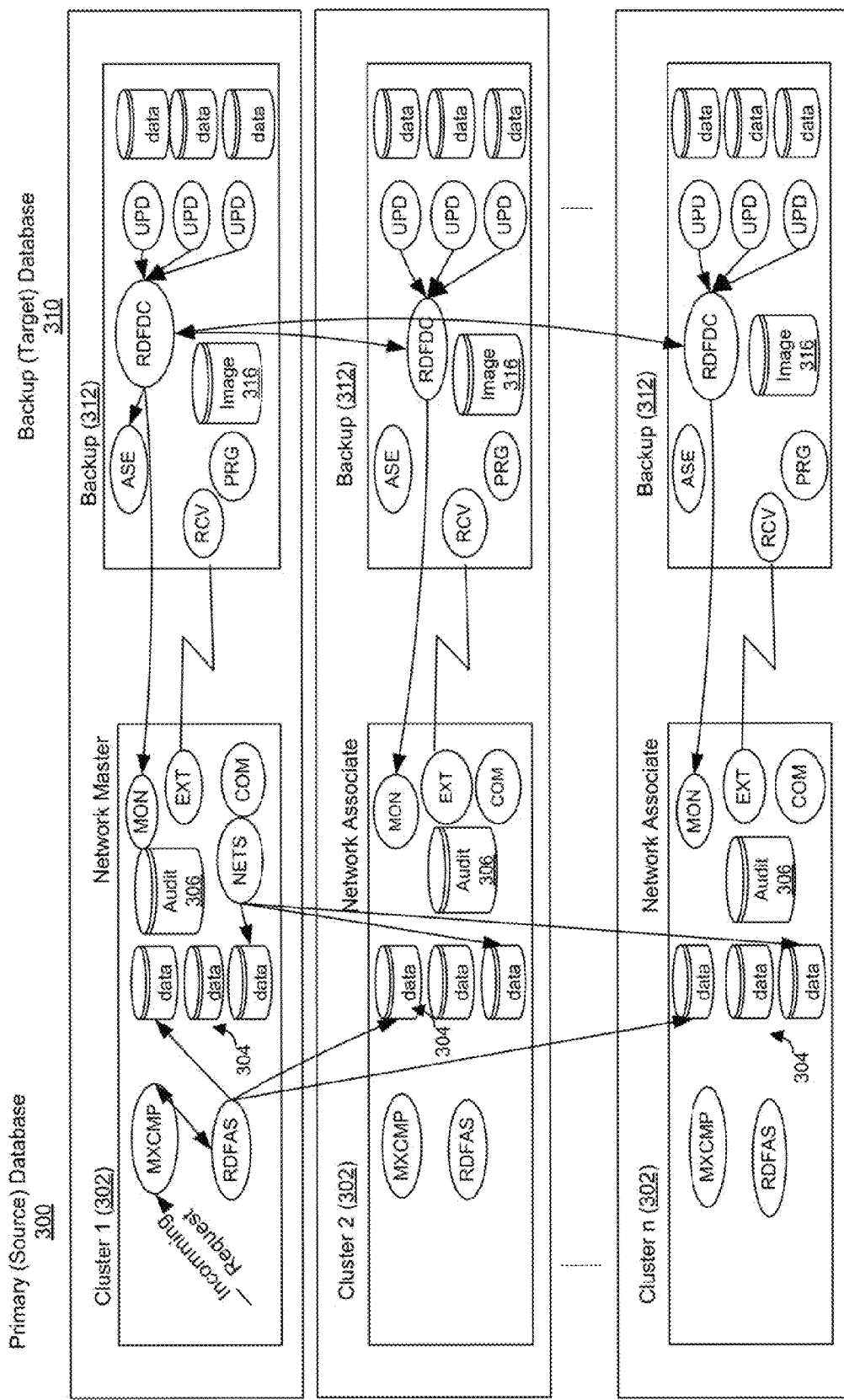
FIGS. 3A, 3B, and 3C show a distributed storage system that implements a method to coordinate replication of DML, DDL, and Utility operations on objects distributed across multiple nodes in primary and target databases in accordance with an exemplary embodiment.
Figure 3B:
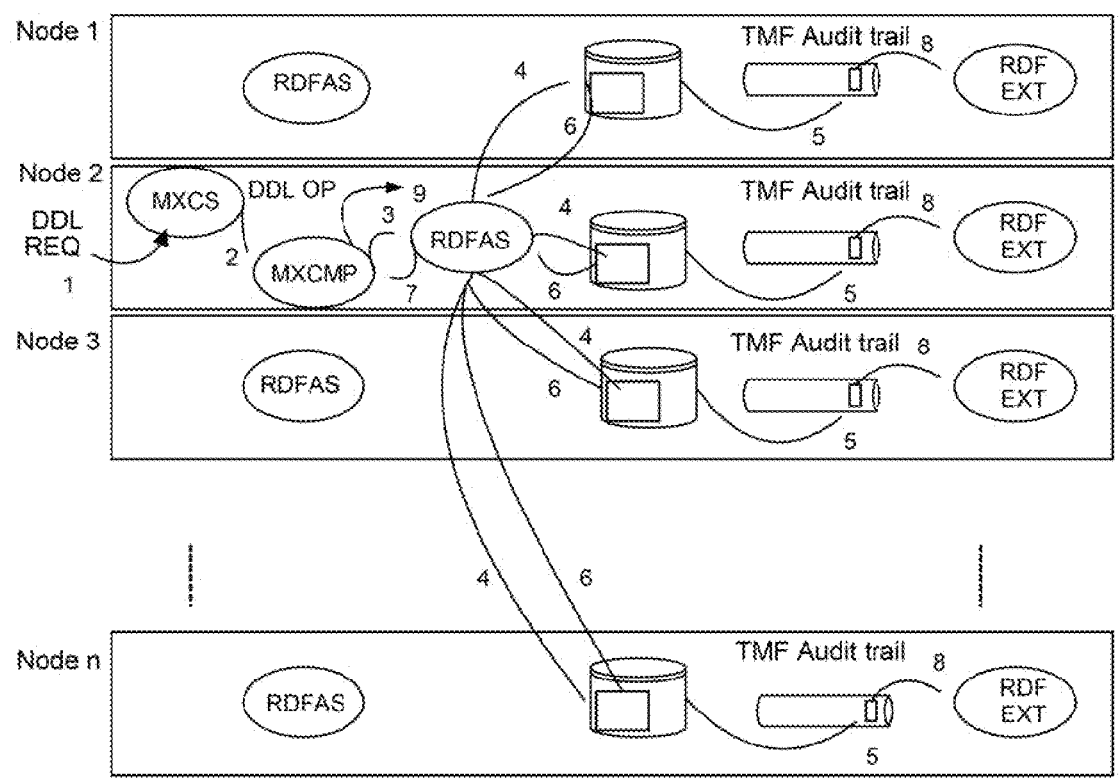
Figure 3C:
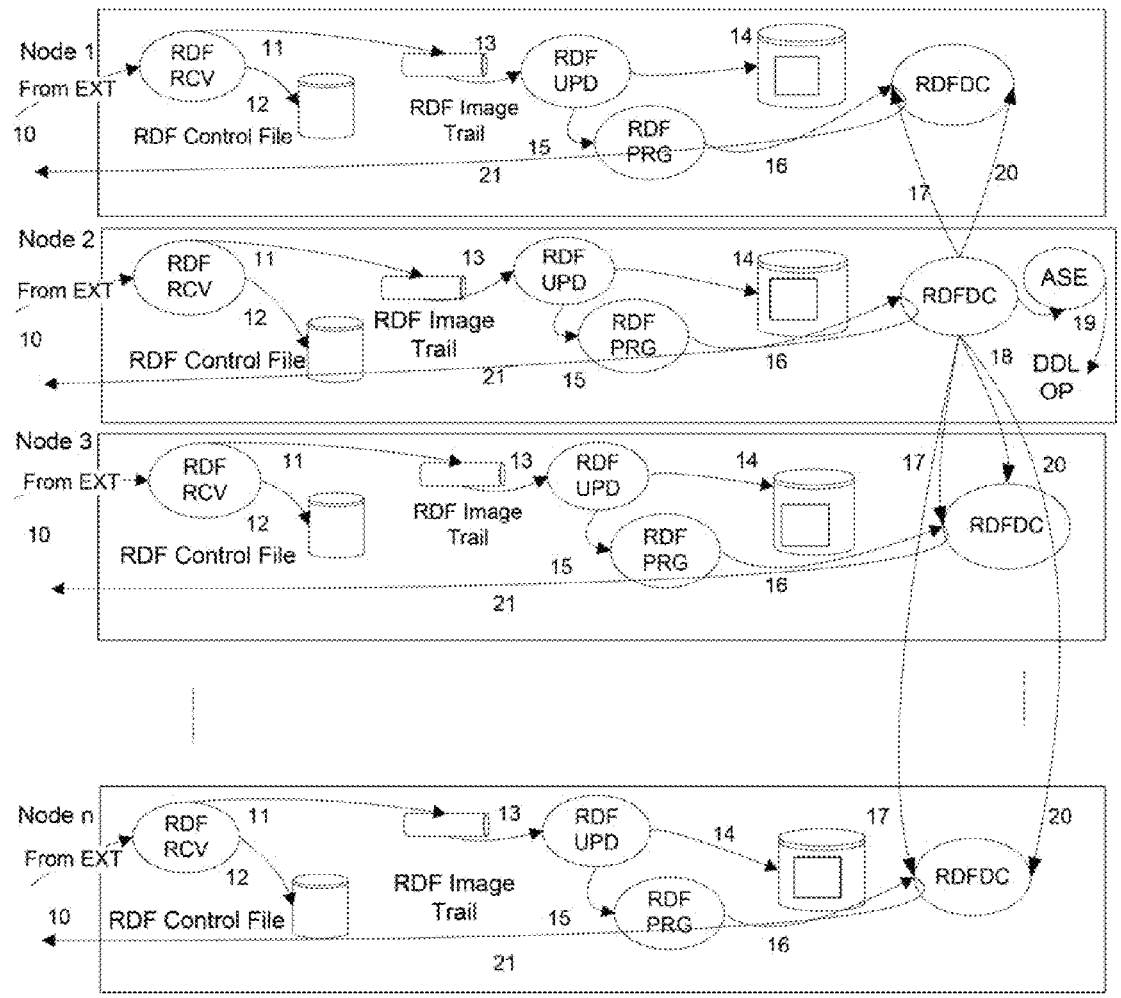

FIGS. 3A, 3B, and 3C show a distributed storage system that implements a method to coordinate replication of DDL and Utility operations on objects distributed across multiple nodes in primary and target databases in accordance with an exemplary embodiment of the present invention.

A local, source database 300 is partitioned and distributed among one or more computer systems or clusters 302 (shown as cluster 1, cluster 2, to cluster n).

Each computer system includes its own application programs, local transaction manager, and database 304. The local transaction manager (i.e., local to the database for a particular node) stores audit records in its local audit trails 306 reflecting application program modifications to the local portion of its database.

A remotely located, target database 310 is partitioned and distributed among one or more of the computer systems or clusters 312 (shown as backup 1, backup 2, to backup n). A remote database duplication facility (RDF) maintains virtual synchronization of the target database 310 with the source database 300.

The RDF includes a plurality of extractor processes (EXT) executing on each of the local computer systems, a plurality of receiver processes (RCV), and a plurality of updater processes (UPD) executing on the remote computer systems, one audit sync process (RDFAS) executing on each node in the local cluster, and one DDL coordinator (RDFDC) executing on each node in the remote cluster. In FIGS. 3A-3C processes are shown in circles or ovals, and numbers (1, 2, 3, 4, ... 20) are shown for exemplary steps or actions being implemented.

Separate from the RDF, but integral to the operation, there is a SQL connection server (MXCS) and a SQL catalog manager (MXCMP) running on every node on the primary cluster and an Asynchronous SQL Executor (ASE) running on each node in the backup cluster. The extractor processes (EXT) extract audit records from the local audit trail and transmits those records to the receiver process (RCV). The receiver process (RCV) distributes those records into a plurality of image trail files 316 in the node the receiver is running on in the remote cluster for processing by updater processes (UPD). The update processes, in turn, initiate redo operations of database modifications denoted in at least a subset of the audit records against the portion of the target database residing on that node.

An RDF DDL coordinator (RDFDC) runs on each node in the backup cluster 312 and is responsible for ensuring synchronization between the individual nodes with respect to the DDL operation relative to other insert/update/delete operations surrounding the DDL in each audit trail. The RDF DDL coordinator (RDFDC) is also responsible for communicating with an ASE to trigger DDL operations on the target cluster. One ASE runs on each node in the backup cluster and is responsible for executing DDL and Utility operations on the target database. For simplicity DDL and SQL utility operations are generically called DDL operations.

At the beginning and end of a user initiated DDL operation, an MXCS process accepts the user operation and passes it to a catalog manager (MXCMP) on the source cluster, which makes a procedure call to a RDF audit sync process (RDFAS). This procedure call transmits a variety of information that may include the normalized SQL statement text, operation identifier, and an operation type.

Based on the procedure call used and the information transmitted, the audit sync process can identify the start and end of specific DDL operations and serially marks the logical location of these operations by writing into one or more well known audited files. These audited files are interpreted as synchronization points by other RDF processes when they read the audit and or image trails.

The RDF updaters run normally and process image records as a they have done previously, but will suspend processing image records when they encounter one of these synchronization points in their image trails. Updaters are synchronized on all Start DDL, End DDL, transaction state change (ABORTING), and final transaction states for DDL transactions. Transactions are remembered by the updaters from the moment a primary side transaction performs its first DDL operation until the time it commits. Any DML operations performed by that transaction are performed under a separate transaction by the updater. After the first DDL operation is performed by the ASE (SQL), the transaction identifier under which it was performed is made known to the updaters (UPD). DML operations performed by the primary side transaction that occur prior to the first DDL operation are not performed in separate transactions by the updater. Any interleaving DML transactions are handled by the normal updater processing (i.e., not using the DDL transaction).

Updaters have two restart locations which they track: One location for the oldest uncommitted DDL operation, also known as the OUDO, and one location for the standard redo transactions. Upon restart, updaters will start at the earlier of the OUDO position if one exists, or the location of the last committed updater DML transaction. Restarting at the OUDO position, updaters will skip any audit for DDL transactions that has already been applied on the backup system. This is possible when concurrent DDL transactions are allowed and a subsequent DDL transaction commits prior to the first DDL transaction. Restarting at the OUDO position, updaters will ignore any redo audit prior to the redo start location from the last context save timer. Once a DDL operation is started, the updaters will not update their OUDO restart location until that transaction commits. If one updater has a restart and an active updater DDL transaction exists, it triggers a restart for all updaters in the network, by aborting the DDL transaction through the ASE.

The RDF DDL coordinator constantly monitors the updaters on its node. When all updaters on its local node suspend at a common synchronization point on a given node, that node is prepared (synchronized) for any DDL processing that is required. Each node independently prepares itself in this way, and the RDF DDL coordinator on one node is responsible for ensuring that all nodes in the cluster are properly synchronized before any action is taken. When all nodes are synchronized, the responsible DDL coordinator invokes the ASE on its local node indicating the operation to be performed. The ASE then performs the requested action which can safely modify any portion of the entire database. At the completion of the requested action, the ASE notifies the responsible RDF DDL coordinator. The RDF DDL coordinator, in turn, notifies each of the other RDF DDL coordinators on the other nodes in the cluster. Each RDF DDL coordinator causes the updaters to resume processing of the database changes from their image trails.

TMF Network Join

In one embodiment, RDF updaters across all segments process user generated DML that is part of a transaction that also performs DDL in a common transaction. This process ensures that the precise behavior of the transaction on the primary side is preserved on the backup side (i.e., the modifications is fully present across all segments). By definition these updater transactions will be Transaction Management Facility (TMF) network transactions.

DML and DDL in Same User Transaction

DDL and Utility replication demonstrate the same behavior on the backup system that a customer would observe on the primary system. For instance, it is an acceptable practice for a user to begin a transaction and perform multiple DDL operations as well as DML operations mixed with DDL operations before deciding to commit the transaction. Exemplary embodiments provide these operations to occur on both the primary and backup database systems.

Exemplary Scenarios

In one embodiment, the SQL database management system (SQL/MX) is responsible for the application of DDL operations, and the RDF updaters are responsible for application of DML operations. As described below, mechanisms are provided for enabling and coordinating SQL/MX and RDF updater interaction. Three usage scenarios are provided below for illustration.

Scenario 1: Concurrent DDL and DML

SQL/MX tables can be accessed concurrently by many transactions, and these transactions can perform both DDL and DML operations. Likewise it is possible for transactions to perform DML operations before a DDL operation and for other transactions to perform different DML operations after the DDL transaction. Generally, the same transactions do not perform DML operations both before and after DDL operations. One exception occurs when the DDL operation is performed in the same transaction as the DML operation which preceded the DDL operation. In this case, the transaction is not excluded from accessing the SQL object by locking protocol. In this case, the specified transaction could also perform DML operations after the DDL operation before committing, as shown below:

Example 1

| | |
|---|---|
| update CATX.SCHY.TZ | (transaction 1) |
| commit | (transaction 1) |
| alter table CATX.SCHY.TZ | (transaction 2) |
| commit | (transaction 2) |
| update CATX.SCHY.TZ | (transaction 3) allowed |

Example 2

| | |
|---|---|
| update CATX.SCHY.TZ | (transaction 1) |
| alter table CATX.SCHY.TZ | (transaction 2) |
| update CATX.SCHY.TZ | (transaction 1) Not allowed |

Example 3

| | |
|---|---|
| update CATX.SCHY.TZ | (transaction 1) |
| alter table CATX.SCHY.TZ | (transaction 1) |
| update CATX.SCHY.TZ | (transaction 1) allowed |

DDL Replication ensures that all audit for Insert Update Delete (DML) operations from transactions that precede DDL operations have been applied on the backup side and that the RDF updaters have closed all files before replication of the DDL operation is started. Furthermore, DDL Replication ensures that DDL operations are initiated before allowing RDF updaters to resume application of DML on the backup side. This process does not mean that the transaction the DDL operation was performed under is committed on the backup side before the updaters are allowed to resume. Instead, the process ensures that SQL/MX has completed all of the necessary work in support of the DDL operation to make it persistent if the primary side transaction were committed by the user.

Scenario 2: DDL Transaction that Abort on the Primary Side

DDL operations are executed under transaction protection and can thus be aborted and backed out, as shown below:

```
begin work;
create table ....;
<CPU halt on primary side>
```

In this scenario, TMF automatically rolls back the uncommitted transaction and undoes the primary side create operation. DDL replication ensures that the create operation gets backed out on the backup side as well.

Scenario 3: Failed Utility Operation

In one exemplary embodiment, Utility operations are not executed under a single atomic transaction. TMF cannot completely backout a Utility operation in case of failure, and explicit recovery is therefore required. For example, assume that the primary side CPU where the following operation is executed halts before the operation has successfully completed:

modify table . . . move to . . .

In this example, TMF cannot undo the operation. The user therefore cancels or resumes the operation using the RECOVER Utility. DDL Replication ensures that the backup side execution of a Utility operation does not progress any farther than the primary side execution. In this scenario, it means that a primary side RECOVER command will be successfully replicated on the backup side.

Figure 4:
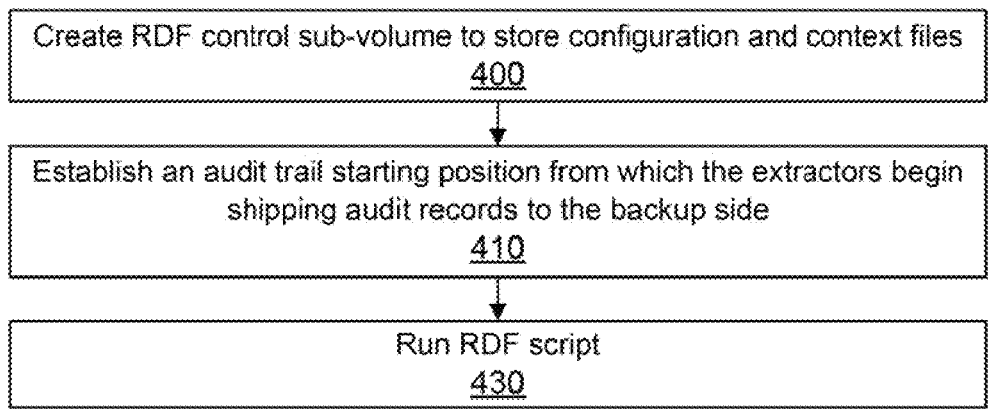
FIG. 4 is a flow diagram showing functions performed as part of initialization in accordance with an exemplary embodiment.

FIG. 4 is a flow diagram showing functions performed as part of initialization. In one embodiment, two main functions are internally performed as part of initialization.

First according to block 400, an RDF control sub-volume is created where all internal configuration and context files are stored. Creation of the RDF control subvolume is a task that relies on a utility that creates a mapping between system names and suffix characters. Using this utility enables automatic generation of RDF control subvolumes without the need to specify a SUFFIX as part of the initialization command.

Second according to block 410, an audit trail starting position is established from which the extractors begin shipping audit records to the backup side. By way of example, two options are available for specifying where extractors should begin processing: NOW and SAFEPOSN. NOW specifies current End of File (EOF) of the audit trail. SAFEPOSN specifies the previously established "Safe Position" for initialization.

The NOW option is appropriate when:
(1) RDF has never been run between the two database systems being initialized;
(2) the databases have fallen out of synchronization; and
(3) replication was stopped for a prolonged period of time such that the TMF audit trails required for RDF to resume processing from where it last stopped are no longer available.

The SAFEPOSN option is appropriate when:
(1) RDF was running previously; and
(2) RDF was not stopped using an ABRUPT option.

The SAFEPOSN option of initialization can be used even if RDF was stopped in the ABRUPT fashion. For this to succeed, the user would restart RDF then stop RDF again without the ABRUPT option. This process will update the position information used by the SAFEPOSN option and allow correct RDF initialization without database synchronization.

According to block 430, initialization consists of running an RDF supplied script on the system. When executing the script, the user supplies the name of the storage system to which the customer wishes to replicate (the backup system) and an indication of where the extractors should start (NOW or SAFEPOSN). Based on the combination of where the script is run and the input provided, exemplary embodiments determine the RDF primary system, the RDF backup system, and the RDF control sub-volume. Internally RDF will "check in" with the Audit Sync processes on each of the segments. The purpose of this is to inform each of the Audit Sync processes that they should start performing audit sync operations for any DDL or Utility operations that are performed on any of the segments from this point forward.

RDF Audit Synchronization Process

In one exemplary embodiment, the RFD Audit Sync process (RDFAS) is a kernel managed persistent process that is fully re-startable. As part of its internal initialization, this process automatically detects any RDF environments that are configured on the system. The process also detects when RDF is configured or deleted from a system. The following RDF scenarios are discussed:

a. Replication is not Enabled:
   DDL and Utility operations are permitted on the primary side, but there is no need to perform any audit sync processing.
b. Replication is Added to an Existing System:
   DDL and Utility operations were previously allowed without audit sync activities. Now audit sync activities are required. Any DDL or Utility operations that occur after RDF initialization must include audit sync processing.
c. Replication is Deleted:
   DDL and Utility operations previously required audit sync activities. Once replication is deleted, no audit sync activities are required.

In some instances, a software upgrade can require replication to be reinitialized. In one embodiment, it is not a requirement to "DELETE" a previous incarnation of replication in preparation of reinitializing it. In other words, a window is not opened where DDL and Utility operations are not replicated to the backup side because the system is being upgraded. Opening such a window could corrupt the backup side database if a DDL or Utility operation were executed by the customer during this window.

Primary Side Processing

Figure 5:
FIG. 5 shows a table that enumerates various situations that arise on the primary side and the effect of these situations on DDL replication in accordance with an exemplary embodiment.

In some storage systems, replication is an optional feature. Further, DDL replication prohibits DDL operations except under rare circumstances as a result of errors or transient states while replication is being configured. The table 500 shown in FIG. 5 enumerates the possible situations that might arise on the primary side as well as the effect this has on DDL replication.

As shown in the table, partial initialization is possible if some number of segments have completed their initialization when others segments have not. In this case, DDL operations cannot be permitted because no guarantee exists that all extractors will ship the required synchronization audit to the backup side. A defined set of APIs are utilized between RDF and SQL/MX that allow SQL/MX to determine which of the above states the storage system is in and what the appropriate behavior should be.

Replication Tables and Files

In one embodiment, a set of SQL/MX objects are created for replication purposes. To the extent possible, these SQL objects are treated as any other database objects to be replicated. RDF does not attempt to decipher the contents of these objects while replication is underway. One such object is the SQL/MX text table, but there will be others which are outside of the domain of RDF.

For RDF purposes it is enough to know that SQL/MX will write "normalized" SQL statements into a table maintained for their purposes and replicated by RDF. In one embodiment, the exact text and layout is of no concern to RDF and will be treated as a black box. Instead, the required text is in a format that is useful for the Asynchronous SQL Executor (ASE) process on the backup system. This text is written into a table on the primary side before SQL/MX attempts to contact the Audit Sync process on the primary system to request a DDL start sync operation.

An exemplary principle file of concern for RDF purposes is the RDF Audit sync file. This is a key sequenced partitioned file with partitions residing on every segment and at least one TMF data-volume for every TMF audit trail. In this way, every receiver is guaranteed to see DML audit for the file which can then be used to trigger updater responses based on the type of DML seen. New records are written to this file as the RDFAS servers are informed of the DDL/Utility operations. This file is replicated to the backup system and is read by the RDF DDL Coordinator (RDFDC) process. All writes to this file contain the transid embedded within, which makes it possible for all involved RDF processes to maintain knowledge of transactions.

Since this file grows over time, old entries can be cleared or deleted. One embodiment provides a utility that deletes records over n days old (a safe time window determined by a user). Deleting records from the primary side means RDF automatically replicates the deletes to the backup. The act of cleaning up old entries in this file will generate audit. As such, in one embodiment, the extractor does not treat delete audit records to this special file as it treats the inserts (this prevents the extractor from initiating suspend logic).

Backup Side Processing

In one exemplary embodiment, the RDF updaters on the backup system suspend updating the database whenever they are synchronized in the various phases of DDL replication. The RDFDC process on the backup system segment corresponding to the primary segment where a DDL operation was executed is responsible for verifying all updaters have paused at the correct location and for communicating with the SQL ASE to cause the DDL operation to occur on the back system. Once the operation has been executed, the RDFDC is responsible for informing RDF on the various segments that updating may resume.

OUDO

One embodiment uses knowledge of the Oldest Uncommitted DDL Operation (OUDO) on the backup system. Normal updater transactions are committed on a timer (for example, a one minute timer). Once committed, the updater restart location is updated so that a CPU or DAM failure would not cause the updater to replay audit that has been made permanent to the database.

DDL transactions will have a distinctly different behavior in that they behave in the same fashion on the backup side as they did on the primary side. That is, transactions cannot commit until all preceding audit has been safely applied and a commit is seen on the backup. It is quite possible that these transactions may be active for several minutes and would span more than one interval of updater DML transactions. If any event occurred that would cause an updater to restart, a restart begins at the earlier of the starting position of the OUDO or the updater DML transaction restart location. Consider the following circumstances:

1) Updater DML redo transaction timer pops—triggers a commit and context save for restart location;
2) User transaction tx1 starts first DDL operation;
3) DDL operation 1 for tx1 performed;
4) User transaction tx1 ends first DDL operation;
5) Updater applies DML updates for other transactions;
6) User transaction tx1 performs DML operation;
7) Updater DML redo transaction timer pops—triggers a commit and context save for restart location;
8) Updater applies DML updates for other transactions; and
9) Updater encounters a restart event (CPU or disk process failure).

Normally, the updaters would safely restart at their last context save location (step 7). However, during the restart, the updater's DDL transaction under which DDL operations from tx1 would have been applied on the backup system should be aborted. Since it is aborted, the DDL operation performed in step 3 would be undone. Thus a restart occurs at step 2 to make the database consistent.

In response to a restart at step 2, one embodiment performs redo DDL operations for tx1 and any associated DML for tx1. Here, the embodiment does not reapply any of the updater DML from other transactions until the process reaches the restart location saved from the last context save as a result of the time pop from step 7. Although tx1 did not commit, there might be another transaction that started after tx1, performed a DDL operation, and committed. As such, in one embodiment it is not safe to apply any DML to the affected object prior to the committed DDL operation. Theoretically other DML could be reapplied for unaffected tables, but there is little point in doing so as it would just slow the updaters down. Thus, one embodiment skips the audit altogether until the redo transaction restart location is reached.

In one exemplary embodiment, DDL operations are not redone that were previously performed and committed on the backup system during an updater restart. As an example, under the following conditions:

1) Updater DML redo transaction timer pops—triggers a commit and context save for restart location;
2) User transaction tx2 starts first DDL operation;
3) DDL operation 1 for tx2 performed;
4) User transaction tx2 ends first DDL operation;
5) Updater applies DML updates for other transactions;
6) User transaction tx2 performs DML operation;
7) User transaction tx3 starts first DDL operation;
8) DDL operation 1 for tx3 performed;
9) User transaction tx3 ends first DDL operation;
10) Tx3 is committed;
11) Updater DML redo transaction timer pops—triggers a commit and context save for restart location;
12) Updater applies DML updates for other transactions; and
13) Updater encounters a restart event (CPU or disk process failure).

This exemplary embodiment would restart the OUDO corresponding to the start of the first DDL operation for tx2. Notice, however, that tx3 occurs after this position and that tx3 is already committed and applied to the database on the backup side. In this case, audit for tx3 is ignored until the location saved in context at step 11 is reached.

RDF DDL Coordinator Process

Figure 6:
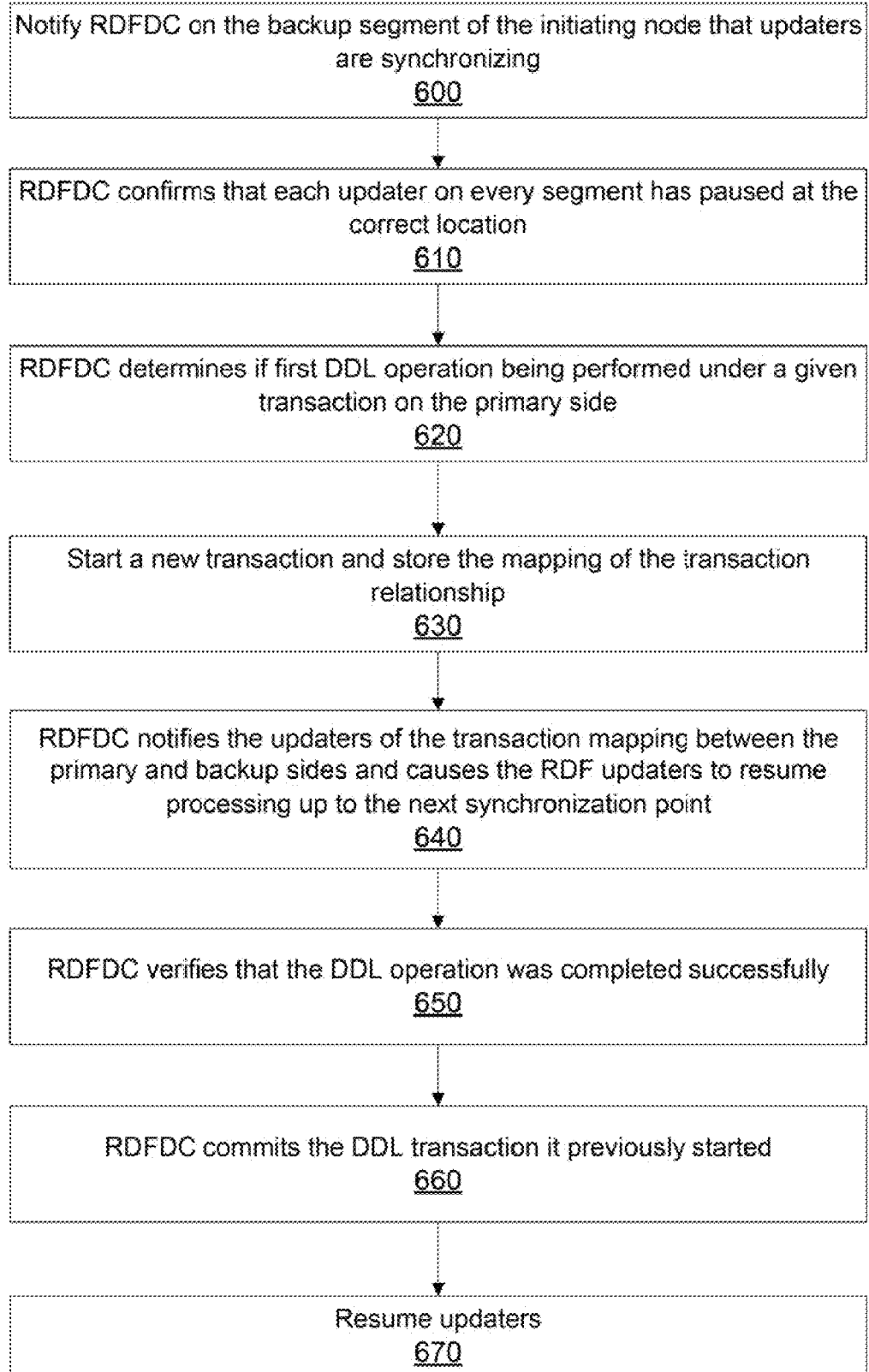
FIG. 6 shows a flow diagram for an RDFDC process in accordance with an exemplary embodiment.

In one exemplary embodiment, the RDFDC is a process pair that is a child process of the RDF monitor. The RDFDC process is responsible for communicating with the SQL ASE in a coordinated fashion with the RDF updaters in order to ensure that DDL and DML changes occur at the appropriate time. As the coordinator, the RDFDC is responsible for beginning and ending the transactions under which DDL operations will be performed on the backup system. FIG. 6 shows a flow diagram for an RDFDC process.

According to block 600, when a DDL operation is being replicated, the RDFDC on the backup segment of the initiating node is notified that updaters are synchronizing.

According to block 610, the RDFDC confirms that each updater on every segment has paused at the correct location to ensure it strictly coincides with the desired synchronization point.

According to block 620, once the position is verified, the RDFDC determines if this was the first DDL operation performed under a given transaction on the primary side.

If this was the first DDL operation on the primary side, it will be the first DDL operation on the backup side and a dedicated transaction for this DDL operation will not yet exist. In this case according to block 630, the process starts a new transaction and stores the mapping of the transaction relationship to disk. At this point it makes no difference if this is the first DDL operation or the nth since the RDFDC communicates with the ASE and directs the ASE to perform the DDL operation on the backup system.

According to block 640, while the ASE is performing the DDL operation, the RDFDC notifies the updaters of the transaction mapping between the primary and backup sides and causes the RDF updaters to resume processing up to the next synchronization point. This location is the synchronization point for the end of the DDL operation.

According to block 650, after again verifying the updaters are correctly paused at the DDL end synchronization point, the RDFDC verifies with the ASE that the DDL operation was completed successfully before causing the updaters to again resume their DML processing.

This mechanism continues until the updaters synchronize on a DDL transaction commit record. At this point, the RDFDC commits the DDL transaction it previously started for these operations as shown in block 660.

Once the transaction is committed, the updaters can be safely resumed as shown in block 670.

The RDFDC is also responsible for maintaining information regarding the OUDO. Once an OUDO transaction is committed a new OUDO is determined. Furthermore, information about active DDL transactions in the system is deleted from the file maintaining OUDO information. This information, however, is not deleted until a prior OUDO transaction commit location is prior to all other DDL transaction DDL start synchronization positions. In other words, transaction information is maintained even if the transaction has been applied on the backup side until such time as its commit position precedes the OUDO start location.

If the DDL transaction from the primary side aborts for any reason, this is detected by the generation of undo audit by TMF backout or by the presence of an ABORTING transstate audit record. When this detection occurs, the RDFDC is notified and it aborts the corresponding backup side DDL transaction.

Unpinning TMF Audit Trails

Each extractor pins its current audit trail on disk to prevent TMF from reusing the file. Then, each time an extractor finishes reading a file, the extractor opens the next file and pins it. Normally the previously pinned file is not explicitly unpinned. The TMF pinning interface is optimized such that pinning a file with a given sequence number implicitly unpins any previously pinned files with a lower sequence number. In this way files that the extractor has finished reading are free to be recycled by TMF.

One exemplary embodiment alters this paradigm to ensure that the audit trail files corresponding to the safe initialization position that would be used if the SAFEPOSN option were used in RDF initialization are maintained safely on disk for RDF. This prevents TMF from recycling files that would subsequently use an audit trail position that is not on disk. This use would be a catastrophic error that would cause RDF to fail. Recovery from this situation would mean initializing RDF using the NOW token and starting from EOF of the audit trails. This process, however, would mean an entire database synchronization is required (which is not a desirable situation).

Figure 7:
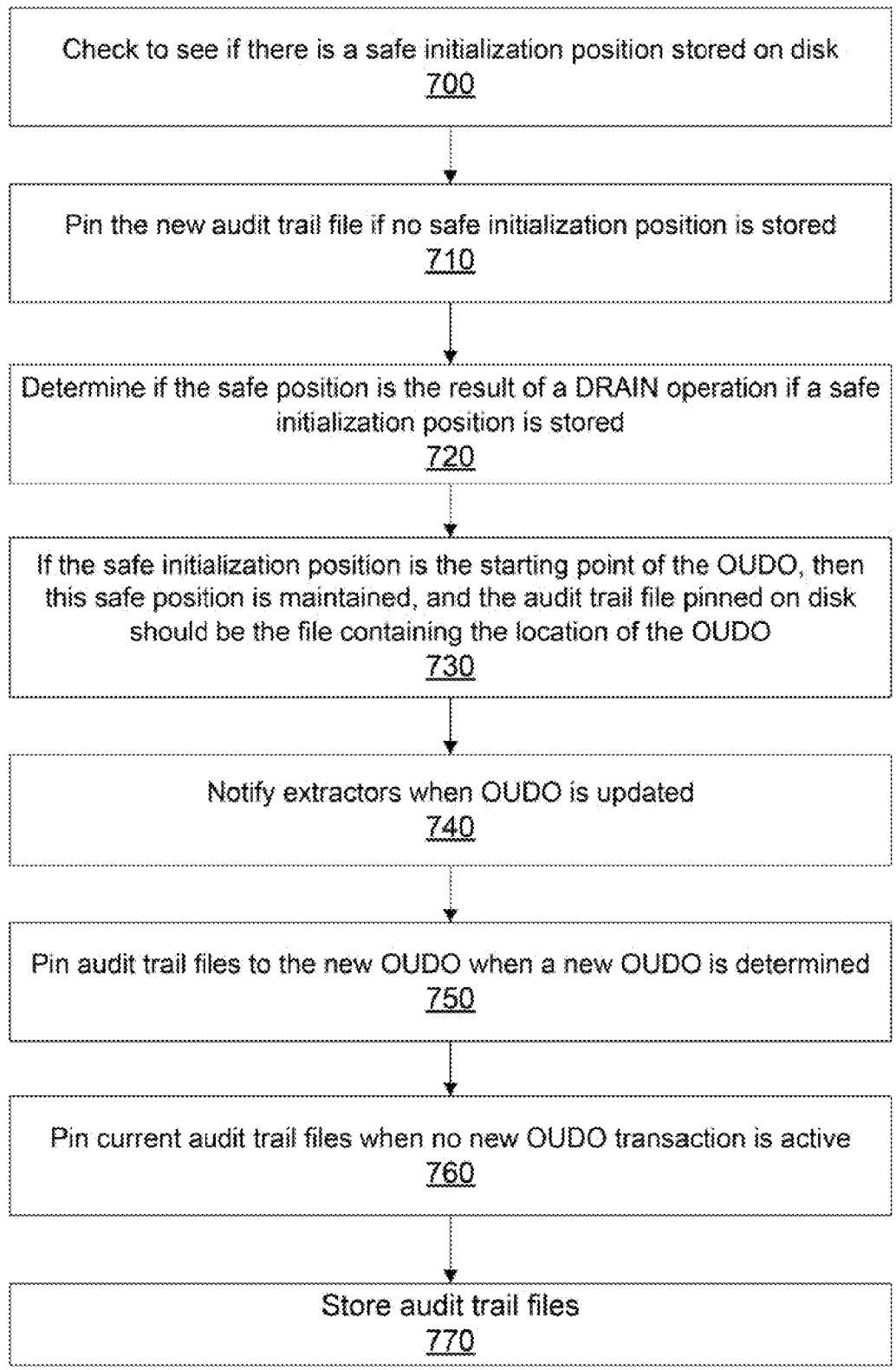
FIG. 7 shows a flow diagram for pinning audit trails in accordance with an exemplary embodiment.

FIG. 7 shows a flow diagram for pinning audit trails. According to block 700, when the extractors roll over into a new audit trail file, the extractors check to see if there is a safe initialization position stored on disk.

According to block 710, if no safe initialization position is stored, then the new audit trail file is pinned.

According to block 720, if a safe initialization position is stored, then a determination is made if the safe position is the result of a DRAIN operation.

According to block 730, if the safe initialization position is the starting point of the OUDO, then this safe position is maintained, and the audit trail file pinned on disk should be the file containing the location of the OUDO. In other words, if an OUDO operation is not applied on the backup system, the process maintains the TMF audit pinned on disk in case there is a need to reinitialize RDF. In this case, the file the extractor just rolled into is not pinned.

According to block 740, any time the OUDO is updated, the extractors are notified.

According to block 750, if a new OUDO is determined, then the audit trail files corresponding to the new OUDO are pinned by the extractors.

According to block 760, if after updating an old OUDO it is determined that no new OUDO transaction is active, then the extractors pin their current audit trail file.

According to block 770, the exemplary embodiment maintains or stores the audit trail files on disk, and no database synchronization is required following RDF initialization.

Updater Processing

In one exemplary embodiment, RDF updaters perform the majority of the replication work. This statement reflects the assumption that most of the replication work will continue to be DML, not DDL or utility operations. In fact, in one exemplary embodiment, there is no externally visible change in the behavior of RDF if there are no DDL or utility operations pending. DML processing continues to be business as usual or normal from an RDF perspective. The externally visible differences come into play when DDL operations are in the replication stream and are coordinated among the segments on the backup system. Here, the customer will see updaters appear to stall briefly when they reach a DDL synchronization point and are waiting for other updaters to synchronize or for the RDFDC process to initiate the DDL operation through the ASE.

One exemplary embodiment conveys some information about what each updater is doing through the error field of their status reporting in the same manner as "SYNCH" is reported when they are in DB synch mode or "UNDO" is reported when they are performing an undo pass. For example, "DDLS" is displayed when synchronizing at a DDL start point and "DDLE" is displayed when synchronizing at a DDL end point (assuming this information is deemed beneficial for quality assurance or customers).

Customers will notice that any failure that causes an updater to restart while DDL replication is underway will not only cause the affected updater to restart, but it will cause all updaters, even those on other segments to restart. This restart is a result of DDL operations being performed to undo a common transaction.

In one embodiment, the updaters simultaneously maintain more than one transaction with one transaction for normal redo processing. Additionally, the updaters will have one separate transaction for each active transaction on the primary side that is performing DDL operations. The updaters will know a mapping of primary and backup side transactions such that transaction PT1 on the primary side that performs DDL operations maps to updater transaction BTn on the backup side. Every updater will learn about this transaction from the RDFDC process that is responsible for initiating the DDL operation on the backup system. The RDFDC can inform RDF processes (for example, the receivers) on the individual segments. These receivers can cascade that information only to their assigned updaters so that one RDFDC process does not need to send messages to each of the individual updaters.

Each updater will join the transaction at the start of the first DDL start synchronization point for a given DDL transaction. After the initial join, the updaters will merely maintain knowledge of the transaction so that they can make that transaction active appropriately. The updaters may have many such DDL transactions that are active on the system at a given moment and can open a TMF T file.

When the updaters are queuing audit to the disk process, they continually examine the transaction listed in the image record to see if it is one of the DDL transactions mapped to a DDL transaction. If a match does not exist, it can use the normal redo transaction and carry on processing. If it does find that a transaction listed in the image record is a DDL transaction on the primary, the updaters do not send that record to DAM until the updater has emptied all buffers and caused DAM to flush the image and redo context. Then it can substitute the mapped backup side transaction and queue this image record. This process continues in this manner until it finds more redo images to be queued or DML audit from a different DDL transaction from the primary side. Transactions are not mixed in a common buffer. Furthermore, any time transactions change in the updater, a flush is forced of all buffers.

Even though the updaters are not in charge of committing DDL transactions, the redo transactions will continue to be committed on timer intervals. Committing DDL transactions is the responsibility of the RDFDC on the initiator segment. The same RDFDC that started a given transaction for DDL operations on the backup side is responsible for committing that transaction.

Any updater process can trigger an abort of the DDL transaction on the backup side. When any updater aborts a transaction due to an error this will cause all of the other updaters as well as the RDFDC to notice the transaction is aborted. In this case, the updaters restart at the OUDO position. This restart will require the RDFDC to abort all active DDL transactions so there are no conflicts. Before resuming at the OUDO, all aborting transactions are out of the system.

The backup side DDL transaction will also be aborted in the case where the DDL transaction aborted on the primary side. Aborting the transaction ensures that any previous DDL changes made are backed out from the database. In this case the updaters are not restarted. Instead, they continue forward processing. The updaters ignore audit records for this DDL transaction until they get to the undo records corresponding to the first DDL start operation, which is always written into a data-volume on every TMF audit trail, so every receiver will be able to detect the record. This will serve as the next synchronization point for this DDL transaction. From this point forward the updater will continue to process audit records from this transaction as part of its redo transaction. An internal mechanism distinguishes between transactions that abort due to an error on the backup side, which should trigger an updater restart, and transactions that abort in order to mimic the DDL transaction on the primary side, which should not trigger an updater restart. In this situation, the updaters notify the RDFDC to abort the transaction and the RDFDC saves context on all segments before actually aborting the transaction. A further optimization is to only have updaters configured to a MAT (Master Audit Trail) on the originating segment check in with the RDFDC when a transaction is to be aborted (the MAT being a centralized location within a given segment where transaction commit and abort information is stored). This will minimize the number of messages to the RDFDC from the updaters. If an updater is notified that a DDL transaction has aborted it checks to determine the reason for the abort before automatically restarting.

Upon restart, redo audit not applied as part of DDL transactions and committed on a previous timer pop can be ignored since such redo audit is mutually exclusive of any affected objects and is already made permanent in the database. Furthermore, DML updates applied by the updaters in transactions as part of other DDL transactions that were not aborted can also be skipped. This should allow the updater to catch up very quickly as most of the image records will already have been applied and could be skipped.

Purging RDF Image Trails

The changes in pinning TMF audit trails and the differences in updater processing of DDL transactions do not have an impact on the purging of image trail files. Currently image trail files are not eligible to be purged until there is no transaction that might need to be undone in a given file. Stated another way, active transactions are not present in a particular image trail.

RDF Takeover Processing

RDF takeover processing is handled in two distinct phases. The first phase treats each RDF environment on a given pair of segments as independent. Each segment determines which transactions need to be undone based solely on what is known from the image trails on the local segment. All updaters run to EOF on their assigned image trail and wait until the purger informs them of which transactions need to be undone. Once notified by the purger they begin an UNDO pass where they undo operations that were previously applied by performing compensating transactions on the database. After each segment has performed a local phase of a takeover, the master purger determines which transactions should be undone for network purposes. This may result in some segments performing a large amount of undo operations if one of the segments was far behind.

With DDL replication, some of the undo operations are unnecessary because the updaters are not allowed to continue all the way to EOF on their image trails if they encounter an updater synchronization point where not all of the updaters have the entire image. In other words, assume that a single segment falls behind for some reason and that a DDL operation was initiated and possibly completed when a disaster occurred on the primary side. Assume further that an RDF TAKEOVER operation was performed on the backup side.

The updaters will be allowed to continue redo processing until one of the following two events occurs:
1) EOF is reached on their image trail.
2) An updater sync point is reached and not all updaters can sync. This is possible if one or more updaters encounter EOF (they are missing image).

In the case where an updater stops at a synchronization point and at least one other updater on any segment can not reach the synchronization point, the updaters treat the synchronization point as a logical EOF in the image trail. This process occurs because the appropriate DDL operation cannot be performed on the backup side and it is unsafe to allow the updaters to apply audit past the synchronization point unless the DDL operation is performed. In other words, anything applied by these updaters in redo mode is subsequently undone as part of the takeover operation anyway, so they are prohibited from proceeding. This will make takeover processing faster as the updaters will all be more likely to be in similar points in the audit trails and fewer audit records will be sent to DAM.

Error Scenarios

DDL replication ensures that operations succeeding on the primary side also succeed on the backup side, and operations that fail on the primary side also fail on the backup side. Several exemplary scenarios are as follows:
(1) The operation succeeds on both sides.
(2) The operation fails on both sides. There are three possibilities, depending upon the nature of the primary side failure:
 a. DDL operations.
  The primary side transaction will be aborted. Backup side RDF processing will ensure that the corresponding backup side transaction gets aborted as well.
 b. Utility operations that fail in a controlled fashion and explicitly clean up after themselves. The internal utility synch points will indicate if that has happened, the backup side utility will then clean up after itself too.
 c. Utility operations that die in an un-controlled fashion, or otherwise don't clean up after themselves. The internal utility synch points will not indicate if that has happened, the backup side utility will sit in a wait-retry loop until the operation is explicitly recovered on the primary side. The backup side utility will detect that and kill itself; the RECOVER operation will then be executed on the backup side.
(3) The operation fails on the primary side and succeeds on the backup side. The design above ensures that this failure does not happen since the primary side failure is caught by the backup side.
(4) The operation succeeds on the primary side and fails on the backup side. Again the backup side actions depend upon the nature of the failure:
 a. DDL operations.
  The backup side transaction will be aborted. Backup side processing will attempt a small number of retries. RDF will be aborted if the operation fails persistently; manual intervention will be required.
 b. Utility operations that fail in a controlled fashion and explicitly clean up after themselves. This scenario is similar to the one above, and will be treated using the same 'retry/abort' strategy.
 c. Utility operations that die in an un-controlled fashion, or otherwise do not clean up after themselves. Again, the retry/abort strategy will be used; however, such a utility cannot simply be retried. Instead, it is recovered explicitly. The first step in the retry will be to issue a RECOVER . . . RESUME for the affected object. If that succeeds, then the retry was successful. If it fails with an indication that the operation state does not allow it to be resumed, a RECOVER . . . CANCEL will be issued. If that succeeds, the Utility operation will be retried.

If manual intervention is required, the ASE will issue SQL/MX error message <some message> which will be of type DIALOUT; and this message automatically generates an event that triggers a service call (for example, the ASE will issue an event that triggers a service call). A support person that responds to the service call can use the messages to determine the nature of the failure.

Extractor and Receiver Restarts

Extractor restart location is determined by the receiver based on context information stored for the receiver and image trails. Before reading and shipping audit to the receiver, the extractor reads in the list of transactions which have started DDL or utility operations on the primary system. These transactions are stored in memory so that they can be compared to the transactions found in the audit records in the audit trail. If the extractor encounters difficulty reading this information, loading it into memory, or discovers an inconsistency in the data stored, the extractor logs a new event indicating the problem and what the recovery operations would be. Until the error is corrected the extractor will not ship audit to the receiver and RDF will fall behind.

The receiver also maintains information on these transactions. This information is refreshed any time a receiver process is started or encounters a restart event. Further, each time a receiver restarts it implicitly triggers the extractor to restart as part of the extractor synchronization protocol.

In one embodiment, the extractor translates some audit records into RDF synchronization records that the receiver can then store in all of the image trails. For example, this process occurs for the commit record from the RDF start and end synchronization writes, but may also be used for undo operations. These two records have the same MAT position, and the receiver does not update the extractor restart location until both image records are safe stored in the image trails. For undo operations, the extractor or receiver can be optimized to recognize that the DDL transaction has aborted. This may be helpful for triggering an early abort of the DDL transaction on the backup side.

Updater Restarts

Like the extractor and receiver, the updater maintains internal knowledge of interesting transactions. Operations of the updater, however, are more visible to the customer. New events are reported in the rare case where the updater encounters an error trying to load this information into memory. This event can be documented for support personnel, but is not a normal event that a customer sees.

The updaters can encounter restart conditions from external errors, such as disk or CPU failures. In these cases the updaters aborts all active updater redo and DDL transactions. The updaters cannot resume forwarding image records to DAM until the previous updater transactions are completely backed out of the system.

The updaters start at the OUDO position and skip any subsequent DDL operations that might be previously applied on the backup side. Redo transaction processing does not commence until the updaters reach the image trail position stored in the updater's redo context position. Once this position is reached the updater processes all image records normally.

This internal activity is documented so that the external behavior of the updaters restarting at an image position that may appear a long time in the past is understood. There is no way of determining how far back the updaters will need to restart as this location is dependent on the customer behavior and duration of transactions that performed DDL operations on the primary side. Even if the updaters are forced to restart considerably far back in the image trails, the updaters can quickly catch up since they essentially discard all DML image records whose audit trail position is less than the redo transaction restart location last saved in context and only apply audit records that are directly related to DDL transactions. This process results in the updaters reading and throwing away most image records rather than queuing them to DAM.

Manual Intervention the Backup Side

Various backup side conditions can cause retry to fail persistently. Some conditions are external to RDF and SQL/MX, for example a broken file structure. When such conditions have been resolved, a simple RDF restart should be enough to cause successful execution of the failed operation.

Exemplary embodiments enable database replication in a variety of scenarios, such as disaster scenarios where the primary side system is destroyed and planned events such as software migrations or system extensions.

In the event of a communication line failure or the failure of a single segment on the backup side, customers who execute DDL or utility operations will notice that RDF on the remaining segments is unable to move forward due to the need to synchronize all updaters. Note that the extractors and receivers are not affected in that they can continue to ship audit that is being generated on the primary side. Furthermore, DDL Replication will have a positive effect on the availability of the backup side database since there is no need to stop RDF updating and manually execute DDL and Utility operations on the backup side. Indirectly, DDL Replication can speed up RDF Takeover since the synchronization points at the start and end of DDL and Utility operations will prevent updaters from being far behind.

File and Database Formats

In one exemplary embodiment, the format of the RDF Audit sync file is as follows:

$<vol>.< systemname >.ZRDFAUDS
Where:
    <vol> - is the first configured datavol for each TMF audit trail protected by RDF
    <systemname> - is the name of the database system without the leading '\' sign and without the trailing segment number.

The record format of the file is as follows:

| Field | Primary Key | Type | Description |
|---|---|---|---|
| Partnum | * | Int | Number used to force writes to a specific partition associated with an audit trail index. |
| Transid | * | Fixed | Transaction identifier of the transaction performing the current write operation. This may be the DDL transaction, but could also be the RDF transactions used for start and end DDL operations. |
| Operation^num | * | Int | Counter used to keep track of how many DDL operations a given DDL transaction has performed. |
| Op^timestamp | | Fixed | The time the statement was received from MXCMP. |
| Operation^TX | | Fixed | This is always a DDL transaction. It may match the transid above if the write is part of the DDL transaction itself or it may be different if the write is part of a start or end DDL operation. |
| State | | Int | This is an enumerated integer value indicating the state of the DDL operation. The possible values are {UNKNOWN, STARTED, ENDED, APPLIED}. When the initial write is performed as part of the DDL transaction the state field will indicate UNKNOWN. When the start DDL record is written it will have a state of STARTED. Similarly the end DDL operation will write a record with a state of ENDED. In this way we can pick out writes to the same file and for the same operation transaction and know what state a given DDL operation was in at that time. Once the DDL operation is completed on the backup system a write will occur to this file indicating it is APPLIED so that the same DDL operation is never attempted again. |

Exemplary Design Assumptions and Ideas

The following list provides exemplary design assumptions and ideas that can be implemented with one or more embodiments in accordance with the present invention.

(1) RDF provides an audit synchronization process that runs as a persistent process on the primary system and can be called by SQL when a determination is made to synchronize the updaters on the backup system. The purpose of this process is to start an independent transaction, write into a file that resides on each of the segments, and commit that transaction. Depending on the file being written to RDF, the process determines if it is synching at the start or end of a DDL operation. Exemplary points of synchronization are: Start DDL, End DDL, Transstate change (Aborting), and final state (commit or abort).

(2) Updaters are synchronized on all Start DDL, End DDL, transaction state change (ABORTING), and final transaction states for DDL transactions.

(3) From the moment a primary side transaction performs its first DDL operation until the time it commits, that transaction is remembered by the updaters. Any DML operations performed by that transaction are performed under a separate transaction by the updater.

(4) After the first DDL operation is performed by the ASE (SQL), the transaction identifier under which it was performed is made known to the updaters and possibly the extractors or other processes.

(5) DML operations performed by the primary side transaction that occur prior to the first DDL operation are not performed in separate transactions by the updater.

(6) Interleaving transactions are handled by the normal updater processing (i.e., not using the DDL transaction).

(7) Switching between transactions will require sending buffers to DAM early; there should not be audit records for the distinct updater transactions mixed in the same buffer.

(8) Updaters have two restart locations that they track. One location is for DDL operations also known as the OUDO, and one location is for the standard redo transactions.

(9) Upon restart, updaters start at the OUDO position if one exists.
(10) Restarting at the OUDO position, updaters skip any audit for DDL transactions that have already been applied on the backup system. This is possible when concurrent DDL transactions are allowed and a subsequent DDL transaction commits prior to the first.
(11) Restarting at the OUDO position, updaters ignore any redo audit prior to the redo start location from the last context save timer.
(12) Once a DDL operation is started, the updaters do not update their OUDO restart location until that transaction commits.
(13) If one updater has a restart, it triggers a restart for all updaters in the network by aborting the DDL transaction through the ASE.

Exemplary Profiles for User Transactions

The following provides an exemplary profile of a committed user transaction that incorporates both DML and DDL:

Begintransaction (TX1)
1) DML (TX1)
. . .
2) Start_DDL1(TX1)
  DDL OP
3) End_DDL1(TX1)
. . .
4) DML (TX1)
. . .
5) Start DDL2(TX1)
  DDL OP
6) End_DDL2(TX1)
. . .
7) DML (TX1)
. . .
8) Start_DDLn(TX1)
  DDL OP
9) End_DDLn(TX1)
. . .
10) DML (TX1)
. . .
11) COMMIT(TX1)

The following provides an exemplary profile for an aborted user transaction that incorporates both DML and DDL and aborts Begintransaction (TX2)
1) DML (TX2)
. . .
2) Start_DDL1(TX2)
  DDL OP
3) End_DDL1(TX2)
. . .
4) DML (TX2)
. . .
5) Start_DDLn(TX2)
  DDL OP
6) End_DDLn(TX2)
. . .
7) ABORTING(TX2)
. . .
8) UNDO End_DDLn(TX2)
  UNDO DDL OP
9) UNDO Start_DDLn(TX2)
. . .
10) UNDO DML (TX2)
. . .
11) UNDO End_DDL1(TX2)
  UNDO DDL OP 12) UNDO Start_DDL1(TX2)
. . .
13) UNDO DML (TX2)
. . .
14) ABORT(TX2)

In accordance with these profiles, updaters synchronize on state change (aborting) record; and the coordinator aborts common DDL transaction and causes updaters to resume. Once resumed, the updaters ignore all DML and DDL for the primary side transaction until they reach the undo for the first Start_DDL operation. Furthermore, updaters verify that the aborted DDL transaction is no longer active in the system to avoid contention. After the updaters resume, DML for the aborted DDL transaction is now handled like normal RDF replicated audit again. Once the final state record is reached, the updaters synchronize there, and a new restart location is saved in context.

DDL Transaction Processing for Committed Transactions

Figure 8:
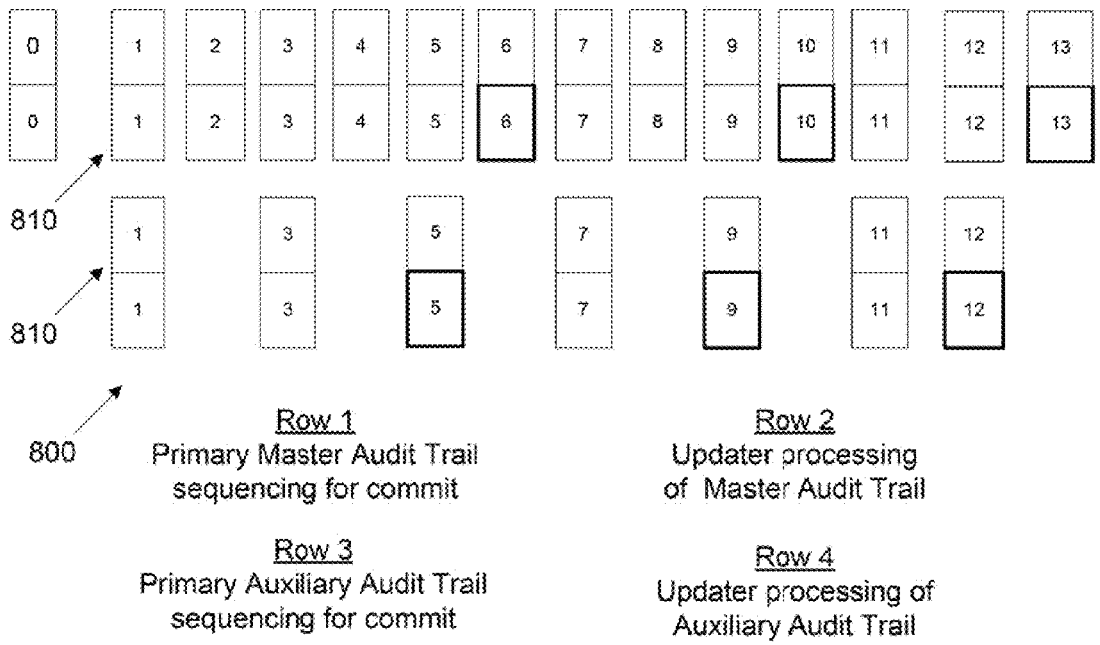
FIG. 8 provides a diagram for DDL transaction processing for committed transactions in accordance with an exemplary embodiment.

FIG. 8 provides a diagram 800 for DDL transaction processing for committed transactions. The diagram 800 shows the audit records 810 as they appear in the audit trails on the primary side and how they will be applied to the backup side.

0) Potential user DML that precedes first DDL operation
1) File label modification (i.e., flabmod) for SQL object (Table lock)
2) Write DDL text into text table
3) Write to DDL Start file (DDL TX)
4) Write to DDL Start file (Start DDL TX)
5) Aux pointer and associated high water marks
6) Commit (Start DDL TX)
7) File label modification(s) for DDL op (DDL TX)
8) Write to DDL End file (End DDL TX)
9) Aux pointer and associated high water marks
10) Commit (End DDL TX)
11) Other user generated DML (DDL TX)
12) Aux pointer and associated high water marks
13) Commit (DDL TX)

The synchronization points for the updaters include the following boxes:
  Row 2: boxes 6, 10, 13
  Row 4: boxes 5, 9, 12.

Records handled in normal updater transactions, not part of DDL, include the following boxes:
  Row 2: boxes 0, 2-4
  Row 4: boxes 3, 5, 9.

Records that are not forwarded to DAM by updaters include the following boxes:
  Row 2: boxes 1, 5-7, 9-10, 12
  Row 4: boxes 1, 7.

Records handled in separate updater DDL transactions include the following boxes:
  Row 2: boxes 11, 13
  Row 4: box 11.

Some records represent auxiliary high water marks after a DDL operation. Such records are either part of the separate DDL transaction or normal updater transaction depending on whether the record was part of the DDL transaction from the primary system. These boxes include:
  Row 4: box 12.

When an updater receives an error from TMF indicating a DDL transaction was aborted, the updater immediately ignores subsequent audit for the DDL transaction until it gets to the final synchronization point corresponding to the ABORT record. In this instance, the updater does not trigger an updater restart as is normally the case.

DDL Transaction Processing for Committed Transactions

Figure 9:
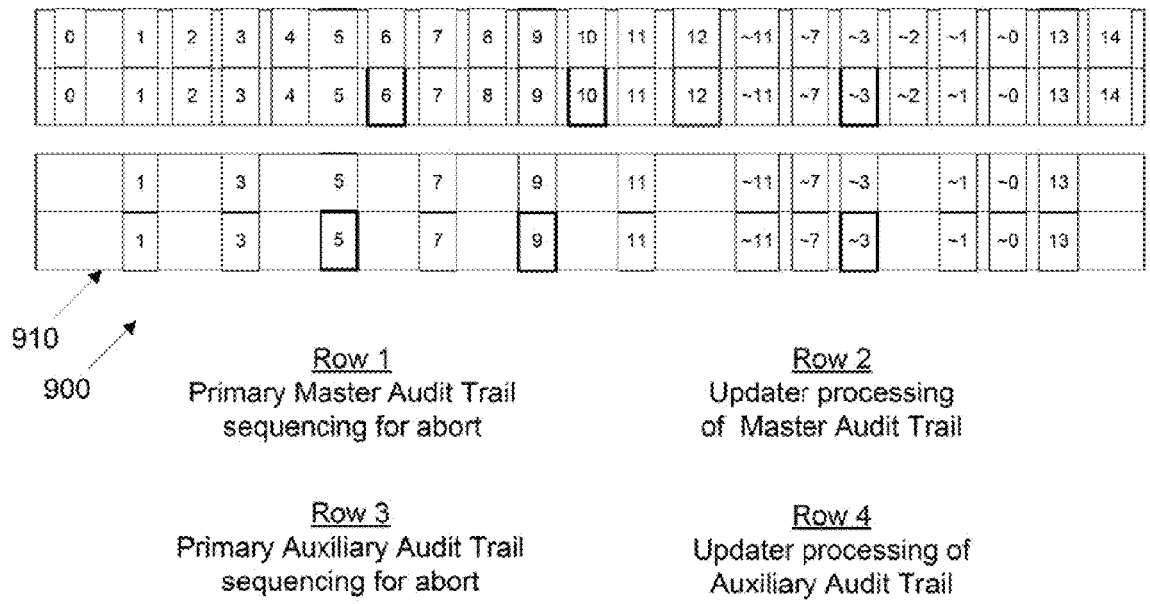
FIG. 9 provides a diagram for DDL transaction processing for committed transactions in accordance with an exemplary embodiment.

FIG. 9 provides a diagram 900 for DDL transaction processing for committed transactions. The diagram 900 shows the audit records 910 as they will appear in the audit trails on the primary side and how they are applied to the backup side.
  0) Potential user DML that precedes 1$^{st}$ DDL operation
  1) Flabmod for SQL object (Table lock)
  2) Write DDL text into text table
  3) Write to DDL Start file (DDL TX)
  4) Write to DDL Start file (Start DDL TX)
  5) Aux pointer and associated high water marks
  6) Commit (Start DDL TX)
  7) Flabmod(s) for DDL op (DDL TX)
  8) Write to DDL End file (End DDL TX)
  9) Aux pointer and associated high water marks
  10) Commit (End DDL TX)
  11) Other user generated DML (DDL TX)
  12) Aborting (DDL TX)
  ~11) Undo other user generated DML (DDL TX)
  ~7) Undo flabmod(s) for DDL op (DDL TX)?
  ~3) Undo write to DDL Start file (DDL TX)
  ~2) Undo write DDL text in text table
  ~1) Undo flabmod for SQL object
  ~0) Undo potential DML preceding 1$^{st}$ DDL operation
  13) Aux pointer and associated high water marks
  14) Abort (DDL TX)

The synchronization points for the updaters include the following boxes:
  Row 2: boxes 6, 10, ~3
  Row 4: boxes 5, 9, ~3.

The following boxes trigger ASE to abort updater's DDL transaction:
  Row 2: box 12.

Records handled in normal updater transactions, not part of DDL, include the following boxes:
  Row 1: boxes 5, 9, 13
  Row 2: boxes 0, 2-4, 8, ~3 to ~0, 14
  Row 3: boxes 5, 9, 13
  Row 4: boxes 3, 5, 7, 9, ~3, ~1, ~0, 13.

Records that are not forwarded to DAM by updaters include the following boxes:
  Row 1: box ~2
  Row 2: boxes 1, 5-7, 9-10, ~11, ~7, 13
  Row 4: boxes 1, ~11, ~7.

Records handled in separate updater DDL transactions include the following boxes:
  Row 2: boxes 11, 12
  Row 4: box 11.

When an updater receives an error from TMF indicating a DDL transaction was aborted, the updater immediately ignores subsequent audit for the DDL transaction until it gets to the final synchronization point corresponding to the ABORT record. In this instance, the updater does not trigger an updater restart as is normally the case.

Both diagrams show that all DML audit is handled by updater redo transactions up until the first DDL operation for any given transaction. This occurs due to the impossibility of predetermining which user transactions might perform DDL operations until they actually perform them. Once DDL operations are performed the updaters take note of the transactions under which the DDL operations are performed. The same DDL operations are performed on the backup side by the ASE, and these audit records are not applied by the updater. Subsequent DML performed in the same user transaction is applied by the updater and is part of the same backup side transaction that the DDL operation(s) were performed under. This ensures atomicity on the backup side.

As soon as any undo (backout generated) audit is detected, this detection indicates that the transaction on the primary side is aborting. The RDFDC process is informed, and it unilaterally aborts the DDL transaction on the backup side. Updaters ignore all subsequent audit for the primary side transaction until the updaters reach the undo insert for the first DDL start operation. They synchronize at this location and wait until the backup side DDL transaction is completely backed out of the system as a result of the transaction being aborted by the RDFDC. Subsequently, the updaters apply any undo of DML that preceded the first DDL operation under the normal redo transaction, just as the DML was applied before the DDL operations started.

Figure 10:
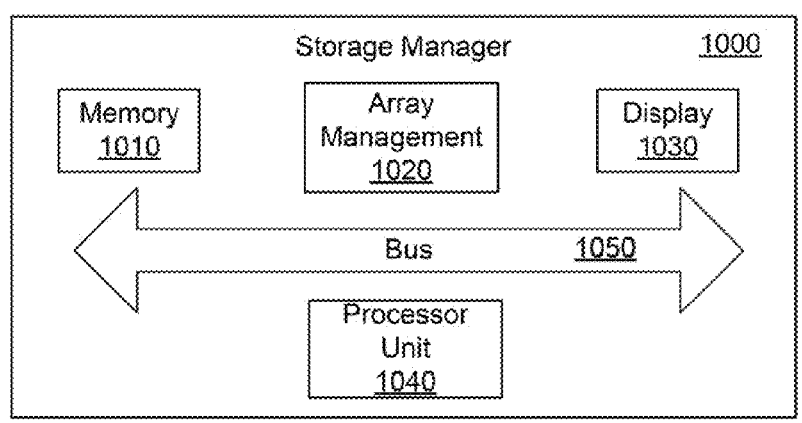
FIG. 10 is a block diagram of a storage manager in accordance with an exemplary embodiment.

FIG. 10 is a block diagram of a storage manager 1000 in accordance with an exemplary embodiment of the present invention. In one embodiment, the manager is a computer that includes memory 1010, array management software or algorithms 1020, display 1030, processing unit 1040 and one or more buses 1050.

In one embodiment, the processor unit includes a processor (such as a central processing unit, CPU, microprocessor, application-specific integrated circuit (ASIC), etc.) for controlling the overall operation of memory 1010 (such as random access memory (RAM) for temporary data storage, read only memory (ROM) for permanent data storage, and firmware). The memory 1010, for example, stores applications, data, programs, algorithms (including software to implement or assist in implementing embodiments in accordance with the present invention) and other data. The processing unit 1040 communicates with memory 1010 and display 1030 via one or more buses 1050.

DEFINITIONS

As used herein and in the claims, the following words are defined as follows:

The term "ARM" or "Audit Revive Manager" means a program and/or method for synchronization at a partition database level.

ASE (Asynchronous SQL Executor) is an SQL process type. ASEs are responsible for the execution of DDL and Utility operations on the backup side, and for the cleanup of replication information that is no longer needed on the primary side.

An audit trail is a chronological sequence of audit records each of which contain data pertaining to and resulting from a database transaction. For example, as a replication engine begins to read database files, it creates an insert audit record for each record in the database and places this insert audit record into the audit trails. The database records are read as serial reads, and reading commences with the first record in the database. The replication engine reads the records in the audit trail and transfers the records into the table of the target database. These records are read until the end of the file. Then, the audit trail is marked to show completion of this file. The replication engine continues until all records are read from the source database and applied to the target database. At the end of the reading process, the primary database and the target database are identical and synchronized even while the primary database is online and constantly or continuously changing.

Backup or Target (Side/System/Database) refers to a database or storage system that acts as the backup when replication is configured. The backup side database is automatically updated by RDF as the result of user updates to the primary side database.

The term "build" or "building" means causing to be constructed and brought into existence according to a plan. Building a database means a new database is created, made, or brought into existence. Building a database is different than updating a database, which means bringing an already existing database up to date with new information.

A "cluster" is a group of two or more computers that work closely together so that in many respects form a single computer. For examples, a cluster is formed by linking multiple computers through a fast local area network (LAN) to improve performance and/or availability over a single computer.

The term "DAM" or "Data Access Manager" means a disk process used for file and record management operations. For example, a DAM provides access to SQL tables and indexes partitioned across storage disks. For another example, a DAM is responsible for generating audit and implementing audit undo/redo interfaces for all SQL objects it manages.

A "database" is a structured collection of records or data that are stored in a computer system so that a computer program or person using a query language can consult it to retrieve records and/or answer queries.

DDL or Data Definition Language refers to part of the SQL language for defining and managing objects in a database.

DDL operations mean the metadata for an SQL table that defines columns, rows, locations, etc. DDL describes the data, but is not the data itself. DDL operations are used to create and drop database objects, and to perform logical and/or physical modifications to the structure of those objects. All DDL operations are atomic, i.e., they execute under transaction protection. A DDL operation can appear in a user defined transaction that can also include DML and other DDL operations.

DDL Replication refers to the automatic replication of SQL/MX DDL and Utility operations, using the RDF product.

DML (Data Modification Language) operations are used to modify the data contained in database objects.

IUD (Insert Update Delete) is another way of specifying DML operations.

OUDO (Oldest Uncommitted DDL Operation) refers to the oldest uncommitted DDL operation and is typically tracked for various restart and initialization scenarios.

A node is a computer, server, or storage device connected to a computer, storage network, and/or other nodes. For example, a single node can include multiple central processing units (CPUs) coupled to multiple disks, such as 16 CPUs coupled to 250 disks.

Primary or Source (Side/System/Database) refers to a database or storage system that acts as the primary database system when replication is configured. Users update the primary side database directly, and RDF ensures that those updates are replicated to the backup side database.

The term "RDF" or "Remote Duplicate Database Facility" means a utility that furnishes database backup by duplicating transactions that occur on one database to an identical copy of that database on another system.

RDFAS (RDF Audit Sync process) refers to a kernel managed persistent process that runs on every segment. Its purpose is to interact with the SQL/MX catalog manager at specific points in DDL operations so that markers can be written into audit trails on each of the segments to be used later by RDF processes for updater synchronization purposes.

RDFDC (RDF DDL Coordinator) is a process pair that runs on each backup segment and is managed by the RDF monitor as part of the RDF product. Its purpose is to interact with the ASE in order to coordinate DDL operations on the backup system in a synchronized fashion among the various segments.

The term "RDBMS" or "Relational Database Management System" means a database management system in which data is stored in tables and the relationship among the data is also stored in tables.

The term "revive-insert audit" means transaction log records for inserts generated specifically to revive the data of an SQL object (contrasted to transaction log records for inserts generated due to application inserts). The format is generally not distinguishable from audit generated as the result of regular application caused inserts.

SAFEPOSN corresponds to an internal set of audit trail positions (master and auxiliary) that are safe starting points for the RDF extractors to use when initializing RDF. Internally this position is updated under two scenarios. First, a STOP RDF, DRAIN operation is performed. In this case the safe position corresponds to the commit of the drain transid. Second, a new OUDO is determined because the previous OUDO transaction committed.

SQL/MX is a relational database management system for business-critical applications on servers.

Updater Synchronization causes all RDF updater processes across all volumes and all segments to close all files and stop processing audit records until further notice so that specific actions can take place on the backup side without interfering with SQL/MX.

Utility is an operation similar to DDL. The purpose of the operation is to perform modifications to the logical and/or physical structure of database objects. Utility operations do not execute under single transaction protection and cannot appear in user defined transactions. Internally, Utility operations do their own transaction management and include multiple transactions. A failed utility operation typically requires explicit recovery.

The term "SQL" or "Structured Query Language" means a database computer language that retrieves and manages data in relational database management systems (RDBMS), manages database object access control, and/or creates and modifies database schema. For example, SQL is a programming language for managing databases and querying and modifying data in the databases.

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

A "transaction" is a group of database commands that execute as a single unit. A transaction (for example, a single SQL database command) can execute across multiple storage systems and multiple different transaction managers.

The term "transaction log" means a file of updates performed on a database. The transaction log records the history of actions executed by a database management system. For example, transaction logs are a sequence of audit records that include data about when and/or by whom particular records changed. The transaction logs can also include information about the actual changes that were made sufficient to enable reconstruction of the ends states of data and reconstruction of the intermediate states that the data went through before the final state is established.

The term "TRM" or "Table Revive Manager" is a program and/or method for synchronization at a database table level.

As used herein, the terms primary database and source database are interchangeable. Further, the terms backup database and target database are also interchangeable.

In one exemplary embodiment, one or more blocks or steps discussed herein are automated. In other words, apparatus, systems, and methods occur automatically.

The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc., which are examples of tangible computer-readable storage media. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   executing a single database transaction across multiple nodes with each node having a transaction manager;
   synchronizing the transaction across the multiple nodes so a replication operation occurs in a correct order;
   performing the replication operation according to the transaction from a primary database to a backup database so changes to a table in the primary database occur in the backup database without manual intervention; and
   one or more of:
   avoiding inactivating user applications that modify the primary database before initiating a Structured Query Language (SQL) operation, a Data Definition Language (DDL) operation, and a utility operation;
   leaving the primary database online while SQL operations, DDL operations, and utility operations are being executed;
   ensuring that data modifications located in an audit trail of the primary database prior to SQL operation, a DDL operation, and a utility operation on a node in the primary database are applied and durable before a SQL operation, DDL operation, or utility operation is initiated on a node in the backup database;
   automatically triggering a SQL operation, a DDL operation, and a utility operation on the backup database without user intervention;
   replicating user transactions that perform Data Manipulation Language operations, SQL operations, and DDL operations within a same transaction.

2. The method of claim 1 further comprising, synchronizing replication audit trails across clustered nodes that each have independent audit trails.

3. A non-transitory tangible computer readable storage medium having instructions for causing a computer to execute a method, comprising:
   reading audit from an audit trail of a source database distributed across multiple storage systems with independent audit trails;
   replicating the audit trail to a target database distributed across multiple storage systems with independent audit trails without manual coordination by a database administrator; and
   one or more of:
   ensuring that no data modifications located in the audit trail of the source database subsequent to a Structured Query Language (SQL) operation, a Data Definition Language (DDL) operation, and a utility operation are applied before a SQL operation, DDL operation, and utility operation are initiated on the target database;
   ensuring that DDL operations and utility operations on the target database behave exactly as an operation on the source database by enumerating defaults that were present and used on the source database in case the defaults are different on the target database;
   initiating SQL operations, DDL operations, and utility operations as soon as the SQL, DDL, and utility operations are detected on the target database and before the SQL, DDL, utility operations complete on the source database;
   ensuring that a DDL operation executed in parallel on the target database does not complete before the DDL operation completes on the source database.

4. The non-transitory tangible computer readable storage medium of claim 3 having instructions for causing the computer to further execute the method, wherein changes to a structure of a table on the source database are automatically reflected to a table on the target database without requiring manual intervention to make the changes.

5. The non-transitory tangible computer readable storage medium of claim 3 having instructions for causing the computer to further execute the method, wherein each of the multiple storage systems has a transaction manager that stores audit records in a local audit trail reflecting application program modifications to a local portion of the audit trail.

6. A computer system, comprising:
a source database distributed across multiple storage systems; a target database distributed across multiple storage systems; and
a remote database duplication facility (RDF) including a processor that replicates transactions from the source database to the target database so changes to a table in the source database occur in the target database without manual intervention, wherein one or more of:
all Data Manipulation Language (DML) changes to the source database performed prior to changing its physical layout via a Data Definition Language (DDL) or utility operation are applied to the target database before changing a physical layout of the target database to match the source database;
no DML changes to the source database performed after a Structured Query Language (SQL), DDL, or utility operation are applied to the target database until the target database has been modified to match the source database;
user performed DDL and utility operations on the source database are replicated to the target database without manual intervention by an administrator.

7. The computer system of claim 6, wherein the multiple storage systems in the source database and the multiple storage systems in the target database have plural transaction managers that store audit records in a locate audit trail.

8. The computer system of claim 6, wherein the multiple storage systems in the source database and the multiple storage systems in the target database have independent audit trails.

* * * * *